Sept. 12, 1967     T. H. TOEPPEN     3,341,168
APPARATUS FOR THE CONTROLLED DISTRIBUTION OF LIQUIDS
Filed March 25, 1964
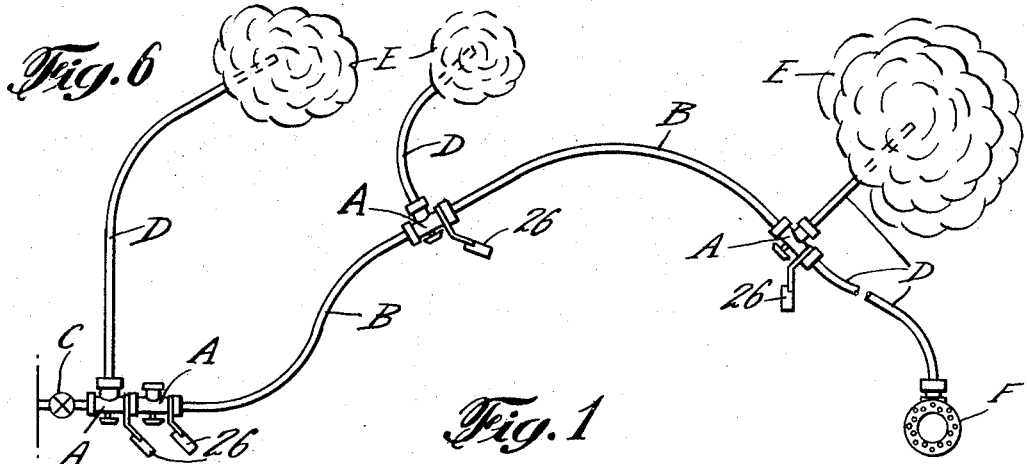
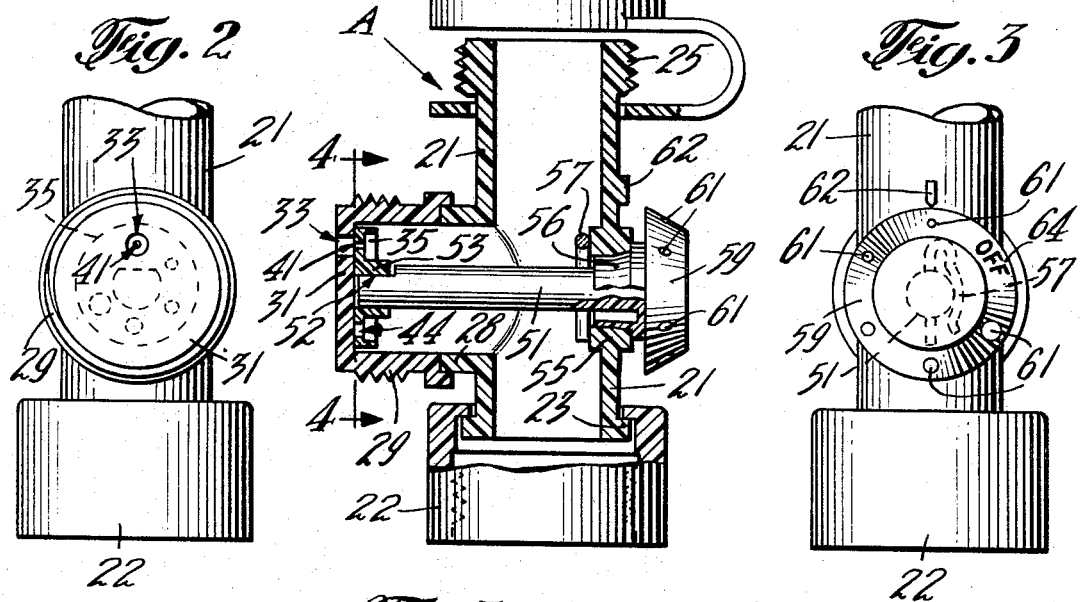
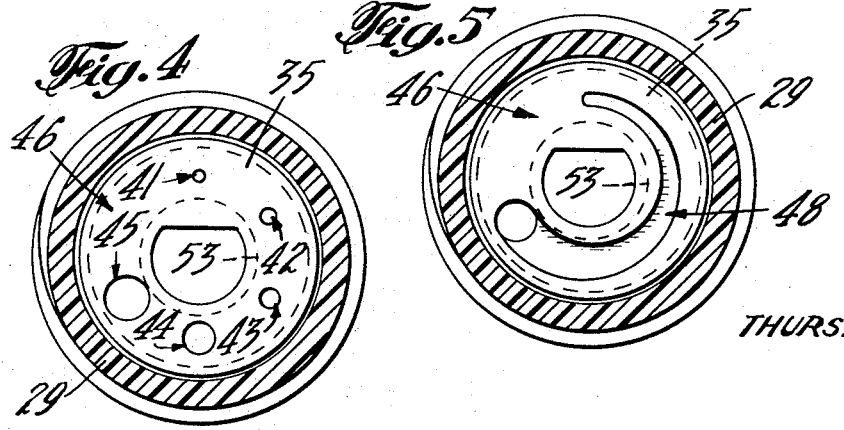
INVENTOR.
THURSTON H. TOEPPEN

United States Patent Office 3,341,168
Patented Sept. 12, 1967

3,341,168
APPARATUS FOR THE CONTROLLED
DISTRIBUTION OF LIQUIDS
Thurston H. Toeppen, Lois Lane, R.D. 3,
Poughkeepsie, N.Y. 12603
Filed Mar. 25, 1964, Ser. No. 354,535
2 Claims. (Cl. 251—148)

The present invention relates to an apparatus for the controlled distribution of liquids and has particular reference to an improved fitting or distributing device which may be readily connected into a hose or pipe line or the like.

In liquid distribution systems where water, oil, chemicals and other liquids are conveyed through pipes or hose, it is often desired to bleed-off at one or more places a controlled stream of the liquid. By way of example, one simple use for such a controlled stream of liquid is in garden work where it is often desirable to apply a small flow of water continuously over a considerable period of time at the base of a tree or shrub, in order to soak the ground thoroughly without wasting water in excess run-off. In many chemical and oil distributing systems, it is desirable to provide for the continuous flow of a stream of liquid of a predetermined volume from a source of supply for inspection purposes or for manufacturing processes.

It is an object of the instant invention to provide a distributing device which is small in size and economical in construction and adapted to be used in series or at spaced intervals in a liquid conveying line so that controlled quantities of liquid may be supplied to a plurality of points of application simultaneously.

Another object is the provision of such a distributing device which permits accurate adjustment so that the rate of flow of the liquid may be determined readily at a convenient point.

Another object is the provision of such a distributing device in which outlet openings of different sizes are optionally available to selectively control the amount of liquid flowing from the device.

Another object is the provision in such a distributing device of means for adjusting the device to a predetermined size of outlet opening form outside the device and to visibly indicate outside the device which opening the device is set for so as to facilitate the selection of a desired flow of liquid from the device.

Numerous other objects and advantages of the invention will be apparent as it is better understood from the following description, which, taken in connection with the accompanying drawings, discloses a preferred embodiment thereof.

The accomplishment of these objects is effected by a distributing device wihch is provided with inlet and outlet connections so that one or more of these devices may be connected into a liquid conveying line, or secured to each other or to a faucet. Each distributing device also includes a side branch outlet having a pair of cooperating valve elements with cooperating openings for the passage of liquid therethrough, the openings in at least one of the elements being graduated in size and one of the elements being movable relative to the other to selectively effect registration of the openings to bleed off controlled amounts of liquid from the device. A length of hose or pipe may be connected to the side branch of each device to direct the bleed off to the area required.

Referring to the drawings:

FIG. 1 is a part sectional, part elevational view of a distributing device embodying the instant invention;

FIG. 2 is a fragmentary elevational view of the device shown in FIG. 1, as viewed from the left in that figure;

FIG. 3 is a fragmentary elevational view of the device as viewed from the right in FIG. 1;

FIG. 4 is an enlarged sectional view as taken substantially along the line 4—4 in FIG. 1;

FIG. 5 is a view similar to FIG. 4, the view showing a modified form of the invention; and FIG. 6 is a schematic view showing a plurality of the devices connected into a hose line and performing a plurality of irrigating operations simultaneously.

As a preferred and exemplary embodiment of the instant invention the drawing discloses a distributing device A (FIG. 1) one or more of which are adapted to be connected into a hose line B (FIG. 6) attached to a faucet C constituting a source of water supply, although the invention is equally well adapted to other liquid distribution systems such as used in the transmission of oil, chemicals and other liquids. Each distributing device A preferably is provided with a hose D for directing controlled quantities of water from the device to individual shrub or tree areas E to be watered. If desired, a conventional spray head F may also be used at the end of the hose line without greatly affecting the discharge from the devices A. Likewise, the small amounts of water bled off from the devices A would not ordinarily restrict the use of conventional spray head F.

The parts of the distributing device A may be made from brass or the like material but for garden work, preferably are made of plastic materials such as polyvinyl chloride, polypropylene, nylon and the like for economy and durability.

The distributing device A comprises a hollow preferably tubular body member 21 (FIG. 1) having at one end a female screw thread hose connection or coupling 22 held against displacement by a crimped-over flange 23, and having at its opposite end a male screw thread hose connection or coupling 25. These hose connections are utilized to connect the device A to the hose sections B, faucet C, or spray head F as shown in FIG. 6. Where a device A is used at the end of the hose line, the male connection 25 may be closed by a captive cap 26 loosely connected to this end of the device.

Intermediate its length, the body member 21 preferably is provided with a tubular branch of valve housing 28 which communicates with the interior of the body member. This valve housing 28 preferably terminates in a valve element 29 which is permanently fastened to the housing 28 and which is provided with male screw threads to accommodate a female coupling of a branch hose D. The outer end of the valve element 29 is closed by an integral flat diaphragm or valve seat 31 having a single off-center discharge opening 33. If desired this valve seat 31 may be other than flat and may be made as a separate piece securely fitted into the end of the valve element. Also there may be more than one discharge opening 33 where required.

Disposed within the valve element 29 adjacent its seat 31 is a rotatable valve element 35 which preferably is a flat relatively thin disc for leakproof engagement against the flat seat 31. However, if the seat 31 is of a shape other than flat, the rotatable valve element 35 is made to a corresponding shape. This valve element 35 is provided with a plurality of graduated openings or orifices which, through movement of the valve element, may be selectively registered with the discharge opening 33 in the valve seat 31 to permit a controlled quantity of water to flow or bleed from the body member 21.

In the preferred form of the invention the drawing in FIG. 4 shows the graduated openings as a series of spaced control orifices 41, 42, 43, 44, 45, of different sizes or diameters gradually increasing from a very small orifice of for example 1/32 of an inch, to a comparatively larger orifice of for example 1/8 of an inch. These orifices preferably are arranged in a circle concentric with the axis of the valve element.

Hence by rotating the valve element 35 on the seat 31, any one of the orifices may be selectively moved into register with the discharge opening 33 as shown in FIG. 2 and hence a bleed-off stream of water controlled by the size of the registered control orifice will be discharged through the discharge opening. The discharge opening is larger than any of the control orifices so as to prevent interference with the stream of water flowing therefrom. The size of the bleed-off may therefore be readily controlled in the device, regardless of its distance from the faucet or other source of water supply or the place to be watered. Where more than one device is used in the hose line, each device may be adjusted for the size of bleed-off desired. A blank space 46 (FIG. 4) in the valve member 35, when rotated into register with the discharge opening 33, completely covers the opening and thereby entirely cuts off the flow of water from valve element 29, if such is desired.

As a modified form of the invention, an arcuate tapered slot 48 (FIG. 5) or groove with entrance orifice, communicating with the interior of the body member 21 may be provided in the valve element 35 as a substitute for the graduated orifices 41, 42, 43, 44, 45. Such a slot or groove gradually tapers from a small end substantially the size of the small control orifice 41 to a large end substantially the size of the largest control orifice 45. Such a graduated opening, when rotated into position to register a selected portion thereof with the discharge opening 33, permits of a controlled discharge of water from the device in substantially the same manner as that effected by selective rotation of the orifices into register with the discharge opening.

It should be understood that the locations of the discharge opening 33 and the control orifices or slot may be transposed if desired. Accordingly, the control orifices or slot may be located in the valve seat 31 and the discharge opening 33 may be located in the rotatable valve element 35.

As shown in the drawing, the valve element 35 is rotatable. For this purpose the valve element is mounted on one end of a coaxial, rotatable stem 51 (FIG. 1) which extends into and through the body member 21. The valve end of the stem 51 is formed with a flat key face 52 which fits loosely into a mating bore of a hub 53 on the valve element 35 in such a manner that the valve element may slide slightly along the stem 51 to effect separation of the valve element from the valve seat 31. This is for the purpose of washing out any foreign particles, such as dirt or the like which may be deposited in the valve housing. Water pressure in the body member 21 tends to press the valve element 35 in place against the valve seat 31 when the device is in use.

The opposite end of the stem 51 extends through a bearing or stuffing box 55 formed in the body member 21. The bore of this bearing 55 preferably is tapered to receive a resilient sealing collar 56 on the stem. The collar 56 is formed as a straight sided or cylindrical skirt connected to but spaced away from the stem so that when it is forced into the tapered bearing it conforms to the taper of the bearing and thereby provides a water-tight seal to prevent leakage from the body member. A pin or clip 57 inside the body member 21 and extending through the stem 51 holds the stem in place.

Outside the body member 21, the stem 51 carries a handle or knob 59 for turning the stem and hence the valve element 35 into a selected position. The position of the valve element 35 is visibly indicated outside the body member by indicator marks 61 (FIGS. 1 and 3) which are carried on the knob 59 and which can be aligned with an index mark 62 on the outside of the body member. The indicator marks 61 preferably are dots or circles of a size corresponding to the control orifices 41, 42, 43, 44, 45 in the valve element 35 and are aligned with these orifices so that when any one of the marks is aligned with the index mark 62, the corresponding control orifice will be in register with the discharge opening 33. An "OFF" mark 64 (FIG. 3) is also provided for the blank space 46 in the valve element 35 so that when this mark is aligned with the index mark 62 it indicates that the device is closed against discharge of water therefrom.

Hence by rotating the knob 59 any selected control orifice in the valve element 35 may be quickly and accurately shifted into register with the discharge opening 33 in the valve seat 31 by merely aligning the indicator mark corresponding to the selected orifice with the index mark 62 on the outside of the device.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form herinbefore described being merely a preferred embodiment thereof.

I claim:

1. A distributing device for use with a liquid conveying line, comprising a hollow body member having connections for attaching sections of said conveying line to and from a source of supply of liquid, a tubular branch member formed on said body member and provided with a male screw thread connection for a branch section of said conveying line, a valve seat in the terminal end of said branch member, said valve seat having an off center discharge orifice communicating with the interior of said body member, a valve element rotatably operable against said valve seat, said valve element having a series of control orifices of different sizes for selective registration with said discharge orifice, a stem extending through said hollow body member and extending beyond said body member, said stem being slidably connected to said valve element in keyed relationship thereto, to provide for separation of the valve element from the valve seat, to permit washing out of dirt which may be carried into said body member, and handle means on said stem outside said body member for rotating said valve element on said valve seat to bleed off controlled amounts of liquid from said body member.

2. A distributing device for use with a liquid conveying line, comprising a hollow body member having connections for attaching sections of said conveying line to and from a source of supply of liquid, a tubular branch member formed on said body member and provided with a male screw thread connection for a branch section of said conveying line, a valve seat in the terminal end of said branch member, said valve seat having an off center discharge orifice communicating with the interior of said body member, a valve element rotatably operable against said valve seat, said valve element having a series of control orifices of different sizes for selective registration with said discharge orifice, a stem mounting for said valve element, said stem extending through said hollow body member and having its outer end extending beyond said member, said body member being provided with a stuffing box having a tapered seat surrounding the outer end of said stem, and said stem having connected thereto a collar having a resilient cylindrical skirt disposed in spaced relation to said stem and engaging against and conforming to the configuration of said tapered seat, to provide a liquid-tight seal for said stem, and handle means on said stem outside said body member for rotating said valve element on said valve seat to bleed off controlled amounts of liquid from said body member.

References Cited

UNITED STATES PATENTS

| | | | |
|---|---|---|---|
| 784,228 | 3/1905 | Richwood | 251—206 |
| 1,185,565 | 5/1916 | Williams | 251—208 |
| 1,448,086 | 3/1923 | Paull | 220—38.5 |
| 1,527,927 | 2/1925 | Schroder | 251—206 |
| 1,755,451 | 4/1930 | Morrison | 137—608 |
| 2,088,410 | 7/1937 | Everson | 137—608 |
| 2,510,356 | 6/1950 | Werts | 251—206 |
| 2,581,849 | 1/1952 | Fisch | 220—38.5 |
| 2,628,588 | 2/1953 | Mehler | 251—208 |
| 3,058,718 | 10/1962 | Johnson | 277—212 |
| 3,117,587 | 1/1964 | Willinger | 251—368 |

FOREIGN PATENTS

| | | |
|---|---|---|
| 881,325 | 11/1961 | Great Britain. |

M. CARY NELSON, *Primary Examiner.*

W. R. CLINE, *Assistant Examiner.*